United States Patent
Kissling et al.

(10) Patent No.: US 9,689,727 B2
(45) Date of Patent: Jun. 27, 2017

(54) ULTRASONIC FLOW METER

(71) Applicant: Endress + Hauser Flowtec AG, Reinach (CH)

(72) Inventors: Beat Kissling, Reinach (CH); Quirin Muller, Battwil (CH); Sascha Grunwald, Steinen (DE); Fabian Steiner, Unterentfelden (CH); Wolfgang Brobeil, Weil am Rhein (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/895,391

(22) PCT Filed: May 19, 2014

(86) PCT No.: PCT/EP2014/060185
§ 371 (c)(1),
(2) Date: Dec. 2, 2015

(87) PCT Pub. No.: WO2014/195118
PCT Pub. Date: Dec. 11, 2014

(65) Prior Publication Data
US 2016/0116316 A1    Apr. 28, 2016

(30) Foreign Application Priority Data
Jun. 7, 2013   (DE) .................. 10 2013 105 922

(51) Int. Cl.
*G01F 1/66*   (2006.01)
(52) U.S. Cl.
CPC ............... *G01F 1/66* (2013.01); *G01F 1/662* (2013.01); *G01F 1/667* (2013.01)
(58) Field of Classification Search
CPC ........................................................ G01F 1/66
(Continued)

(56) References Cited

U.S. PATENT DOCUMENTS

| 4,103,551 A | 8/1978 | Lynnworth |
| 4,754,650 A * | 7/1988 | Smalling ................. G01F 1/662 73/861.28 |

(Continued)

FOREIGN PATENT DOCUMENTS

| DE | 447588 A1 | 4/1996 |
| DE | 19549162 A1 | 8/1996 |

(Continued)

OTHER PUBLICATIONS

English Translation of International Preliminary Report on Patentability, WIPO, Geneva, Dec. 17, 2015.

(Continued)

*Primary Examiner* — Jewel V Thompson
(74) *Attorney, Agent, or Firm* — Bacon & Thomas, PLLC

(57) ABSTRACT

An ultrasonic flow meter comprising: a measurement pipe, which has a measurement pipe wall, at least in some parts a basic shape having a rotationally symmetric or polygonal cross-section, and a straight measurement pipe axis; a transmitter for transmitting an acoustic signal on a first signal path; and a receiver for receiving the acoustic signal on the first signal path. The measurement pipe has a plurality of reflection surfaces, by which the acoustic signal on the first signal path is reflected multiple times, and wherein the reflection surfaces are integrally formed from the measurement pipe wall, the reflection surfaces for reflecting the acoustic signal being designed in such a way that one or more of the reflection surfaces at least partially protrude into the basic shape of the measurement pipe and one or more of the reflection surfaces project outward at least from the basic shape of the measurement pipe.

18 Claims, 5 Drawing Sheets

(58) Field of Classification Search
USPC .............. 73/861.25, 861.27–861.29, 861.31
See application file for complete search history.

(56) References Cited

U.S. PATENT DOCUMENTS

| | | | |
|---|---|---|---|
| 5,090,252 A | | 2/1992 | Tschirner |
| 5,650,572 A * | | 7/1997 | Vontz .................. G01F 1/662 73/861.27 |
| 6,345,539 B1 * | | 2/2002 | Rawes ................. G01F 1/662 73/861.27 |
| 7,647,840 B2 | | 1/2010 | Rickli |
| 8,904,861 B2 | | 12/2014 | Berger et al. |
| 9,097,567 B2 | | 8/2015 | Wiest et al. |
| 2004/0129088 A1 * | | 7/2004 | Moscaritolo ........... G01F 1/667 73/861.25 |
| 2006/0156829 A1 * | | 7/2006 | Konzelmann .......... G01F 1/662 73/861.27 |
| 2007/0261501 A1 * | | 11/2007 | Lang ..................... G01F 1/662 73/861.27 |
| 2009/0178490 A1 * | | 7/2009 | Konzelmann .......... G01F 1/662 73/861.29 |
| 2014/0144247 A1 * | | 5/2014 | Wiest ...................... G01F 1/66 73/861.31 |
| 2015/0204704 A1 | | 7/2015 | Wiest et al. |

FOREIGN PATENT DOCUMENTS

| | | |
|---|---|---|
| DE | 19808701 A1 | 9/1999 |
| DE | 10120355 A1 | 10/2002 |
| DE | 10249542 A1 | 5/2004 |
| DE | 102006030942 A1 | 1/2008 |
| DE | 102008055030 A1 | 7/2010 |
| DE | 102009046886 A1 | 9/2011 |
| DE | 102011079250 A1 | 1/2013 |
| DE | 102012013916 A1 | 1/2014 |
| EP | 2202497 A1 | 6/2010 |
| EP | 2270439 A1 | 1/2011 |
| WO | 9624029 | 8/1996 |
| WO | 2006063873 A1 | 6/2006 |
| WO | 2009074163 A1 | 6/2009 |
| WO | 2010069869 A1 | 6/2010 |

OTHER PUBLICATIONS

International Search Report,, EPO, The Netherlands, Aug. 21, 2014.
German Search Report, German PTO, Munich, Feb. 17, 2014.

* cited by examiner

ULTRASONIC FLOW METER

TECHNICAL FIELD

The present invention relates to an ultrasonic flow meter.

BACKGROUND DISCUSSION

Ultrasonic flow meters are often used in process and automation technology. They allow determination of the volumetric flow rate and/or mass flow in a pipeline in a simple way.

Known ultrasonic flow meters often work according to the runtime difference principle. In the runtime difference principle, the different run times of ultrasonic waves, in particular ultrasonic pulses, so-called bursts, are evaluated relative to the direction of flow of the liquid. To this end, ultrasonic pulses are transmitted at a certain angle to the pipe axis, both in and against the direction of flow. Using the runtime difference, the flow rate and thus, the volumetric flow rate can be determined if the diameter of the pipeline section is known.

The ultrasonic waves are generated or received by means of so-called ultrasonic transducers. For this purpose, ultrasonic transducers are firmly attached to the pipe wall of the relevant pipeline section. These are also available as clamp-on ultrasonic flow measurement systems. In these systems, the ultrasonic transducer are pressed from outside of the measurement pipe against the pipe wall. A big advantage of clamp-on ultrasonic flow measurement systems is that they do not contact the measurement medium and are mounted on an existing pipeline.

The ultrasonic transducers usually consist of an electromechanical transducer element, e.g. a piezoelectric element, and a coupling layer. In electromechanical transducer element, the ultrasonic waves are generated as audible signals, and are guided to the pipe wall via the coupling layer, and from there, led into the liquid in case of clamp-on systems, or they are coupled to the measurement medium via the coupling layer in case of inline systems. Then, the coupling layer is also rarely called membrane.

An additional coupling layer, a so-called adaptation layer can be arranged between the piezoelectric element and the coupling layer. The adaptation layer takes on the function of the transmission of the ultrasonic signal and simultaneous reduction of reflection caused by different acoustic impedances at boundary layers between two materials.

Both in the clamp-on systems as well as the inline systems, the ultrasonic transducers are arranged in a common plane on the measurement pipe, either on opposite sides of the measurement pipe, in which case the acoustic signal traverses the measurement pipe once along a secant, projected onto a pipe cross-section, or on the same side of the measurement pipe, in which case the acoustic signal is reflected at the opposite side of the measurement pipe, whereby the acoustic signal traverses the measurement pipe twice along the secant projected onto the measurement pipe. U.S. Pat. Nos. 4,103,551 and 4,610,167 show ultrasonic flow meters with reflections at reflection surfaces provided in the measurement pipe. Multi-path systems, which comprise a plurality of pairs of ultrasonic transducers, each of which form a signal path, along which the acoustic signals pass through the measurement pipe have also become known by now. The respective signal paths and the associated ultrasonic transducers are in mutually parallel planes that are also parallel to the measurement pipe axis. U.S. Pat. Nos. 4,024,760 or 7,706,986 are examples of such multi-path systems. An advantage of multi-path systems is that they measure the profile of the flow of the measurement medium in the measurement pipe at several points, thus being able to provide highly accurate readings for the flow. This is achieved, among other things, by the fact that the individual run times along the different signal paths are weighted differently. However, a disadvantage of multi-path systems is that their manufacturing costs are high, due to the installation of a plurality of ultrasonic transducers and, where appropriate, complex evaluation electronics.

There are various papers for weighting of the signal paths. The "Comparison of integration methods for multipath acoustic discharge measurements" paper by T. Tresch, T. Staubli and P. Gruber in the supplementary publication for 6th International Conference on Innovation in Hydraulic Efficiency Measurements, Jul. 30-Aug. 1, 2006 in Portland, Oregon, United States, compares current methods for weighting the run times along different signal paths to calculate the flow rate.

European Patent, EP 0 715 155 A1 comprises a measurement arrangement with multiple refraction, wherein the subsections of the signal path only constitute a plane that is parallel to the measurement pipe axis. The reflection surfaces on which a first subsection of the signal path ends and a second subsection of the signal path connects are shown in EP 0 715 155 A1 as flat moldings that are attached to the inside of the pipe. Although it is theoretically possible to introduce reflection surfaces from the end faces of a measurement pipe and then weld them in place on the inner wall of the measurement pipe, such a production quickly reaches its limits for smaller measurement pipes with small nominal diameters, as a welding device can be used at great expense and with loss of precision in the positioning of the reflection moldings in case of small nominal diameters. Thus, the theory of EP 0 715 155 A1 is applicable to measurement pipes with large nominal diameters.

German Patent, DE 10 2008 055 030 A1 describes a connector molded by hydroforming in an ultrasonic flow meter. An ultrasonic transducer is inserted in this connector. The signal is transmitted along a straight signal path without the signal being reflected at the pipe wall. The measurement pipe of the flow meter in this case has a flat shape, so that less flows can occur in the flow profile in this pipe through turbulence, unlike round cross sections.

German Patent, DE 102 49 542 A1 describes a coupling surface for coupling an ultrasonic signal from an ultrasonic transducer to a measurement pipe, wherein the coupling surface formed from the measurement pipe has an oblique shape. The measurement pipe also has a molding 10, which provides a reflection surface.

European Patent, EP 0 303 255 A1 describes a measurement pipe of an ultrasonic flow meter, in which a reflection surface is formed integrally with the measurement pipe. Over a wide range, this leads to an average expansion of the measurement pipe, which is unfavorable for the accurate determination of the measured data.

In contrast, German Patent, DE 10 2012 013 916 A1 as well as FIGS. 6 and 7 of the present application shows a measurement pipe of an ultrasonic flow meter with screw-fitted reflection surfaces. First, a connector provided with a thread is formed, in which a reflector can be inserted subsequently. This production version has proven itself, in principle, for all measurement pipes, regardless of their nominal diameter. However, the production requires strict compliance with specified drill patterns and each connector must be machined separately before insertion of the reflector.

An alternative already known variant is the casting of the pipe and the welding of nozzles on the measurement pipe and the subsequent screwing or welding on a reflective surface.

SUMMARY OF THE INVENTION

The object of the invention is to provide an ultrasonic flow meter with several reflection surfaces in the measurement pipe, wherein the measurement pipe can be manufactured with reduced production time.

The object is achieved by an ultrasonic flow meter, comprising: a measurement pipe, said measurement pipe comprising a measurement pipe wall, at least locally, with a basic shape with rotationally symmetrical or polygonal cross-section and a linear measurement pipe axis; a transmitter for transmitting an acoustic signal to a first signal path; and a receiver for receiving said acoustic signal on said first signal path, wherein: said measurement pipe comprises a plurality of reflection surfaces at which said acoustic signal on said first signal path is reflected several times; said reflection surfaces form an integral part of said measurement pipe wall; said reflection surfaces are aligned in such a way for reflection of the acoustic signal that one or more of said reflection surfaces protrude at least partially into the basic shape of said measurement pipe and one or more of said reflection surfaces protrude outwards at least from the basic shape of said measurement pipe, and by an ultrasonic flow meter, comprising: a measurement pipe, said measurement pipe comprises a measurement pipe wall and a linear measurement pipe axis; a transmitter for transmitting an acoustic signal to a first signal path; and a receiver for receiving said acoustic signal on said first signal path, wherein: said measurement pipe comprises a plurality of reflection surfaces at which said acoustic signal on said first signal path is reflected several times, and at least one connector and/or at least one planar functional surface, for arrangement and, if necessary, for determination of said transmitter and/or said receiver on or in said measurement pipe; and said reflection surfaces and said at least one connector and/or said planar functional surface(s) form an integral part of said measurement pipe wall.

A corresponding ultrasonic flow meter has a measurement pipe with a measurement pipe wall, at least partly with a basic shape with rotationally symmetrical or polygonal cross-section and a straight measurement pipe axis.

The measurement pipe can be divided into individual measurement pipe sections or subregions, which are welded together or seamlessly connected with each other, namely without any welds. The latter is preferred, since production of the seamless transitions of the measurement pipe sections or subregions is particularly cost-effective and time-saving. In addition, an additional production step, and an additional component can be spared. The basic form can be formed only in sections, especially only on one measurement pipe section or a subsection of the measurement pipe, or extend over the entire course of the measurement pipe. Known basic forms with rotationally symmetrical or polygonal cross-section in the area of pipe structure are, for example cylindrical shapes or pipes with cuboid jacket often used in gas lines. Of course, other or unusual pipe geometries, e.g. pipes with prismatic jackets are also covered by the subject matter of the invention.

The ultrasonic flow meter also has a transmitter for transmitting an acoustic signal to a first signal path and a receiver for receiving the acoustic signal at the first signal path. In the context of the present invention, the terms transmitter and receiver are to be understood in consideration of the fact that the transmitter and the receiver can be provided by one and the same ultrasound transducer. In this case, the respective ultrasonic transducer has an operating mode for the transmission mode and acts as a transmitter in this operating mode. It also has an operating mode for the reception mode and acts as a receiver in this mode. After transmitting an ultrasonic signal, the ultrasonic transducer can switch from transmission to reception mode, while the ultrasonic signal passes through a signal path in the measurement pipe. During its passage, the ultrasonic signal can be guided perpendicular to the reflection surface and returned along the already traversed signal path to the ultrasonic transducer. If the ultrasonic signal is returned to the ultrasound transducer, it is located in this reception mode, and acts as a receiver. In this context, the transmitter and the receiver are implemented in one and the same ultrasonic transducer by two circuit arrangements (one circuit for the transmission mode and one circuit for the reception mode). However, an arrangement of at least two ultrasonic transducers, acting as transmitter and receiver, which are each switchable between the transmission and reception operating modes is much more frequently and predominantly considered by the subject matter of the invention. The measurement for determining the flow rate or the volumetric flow is carried out by means of the runtime difference method known per se.

The measurement is based on multiple reflection of the ultrasonic signal in the measurement pipe. Preferably, the ultrasonic signal propagates in the axial direction through the measurement pipe, but without exhibiting a parallel course to the measurement pipe axis. The multiple reflection aims to compensate for, in particular, the measurement faults that are caused by the rotation of the flow.

The measurement pipe has a plurality of reflection surfaces at which the acoustic signal is reflected several times on the first signal path for implementation of multiple reflection. Although a plurality of measurement devices, which implement single reflection at the measurement pipe wall, a so-called two crossbeam arrangement, are known, the application targets multiple reflection in this case, wherein the ultrasonic signal is successively reflected in the measurement pipe along partial signal paths.

The reflection surfaces are formed as an integral part of the measurement pipe wall. Integrally formed in this context means that the reflection surfaces are not welded as a separate component on or in the measurement pipe, but are provided by the measurement pipe wall. The measurement pipe wall is shaped in the region of the reflection surfaces from its basic shape in this area. Integrally formed reflective surfaces are known from German Patent, DE 198 61 073 A1 or from U.S. Pat. No. 5 090 252 A. However, these reflection surfaces lead to narrowing or widening of the measurement pipe cross-section, and thus change the flow profile to a considerable extent. The reflection surfaces in the above-mentioned publications are also aligned in certain directions. Thus, only certain signal paths can be implemented; not the signal path illustrated, for example in German Patent DE 10 2012 013 916 A1.

In contrast, the reflection surfaces are aligned in such a way for reflection of the acoustic signal that a plurality of the reflection surfaces protrude at least partially into the basic shape of the measurement pipe and a plurality of the reflection surfaces protrude outwards at least from the basic shape of the measurement pipe. By this considerably more variable alignment of the reflection surfaces, complicated signal path patterns are also possible, without causing larger flow disturbances by measurement pipe constrictions.

It is particularly advantageous if the measurement pipe comprises at least one connector and/or at least one planar functional surface, for arrangement and, if necessary, for determination of the transmitter and/or receiver on or in the measurement pipe, wherein the connector(s) and/or the planar functional surface(s) form an integral part of the measurement pipe wall. Therefore, the measurement pipe does not have any welded or bolted component but integrally formed elements, such as reflection surfaces and connector and/or functional surfaces. Functional surfaces are, for example, advantageous in clamp-on flow meters to achieve maximum air-free transition between the sensor or receiver and the measurement pipe. An additional manufacturing step can advantageously be omitted here, since both the reflection surfaces and the connector and/or the functional surfaces can be implemented by one and the same shaping processes.

Another inventive ultrasonic flow meter comprises a measurement pipe with a measurement pipe wall and a straight measurement pipe axis. The measurement pipe also has a transmitter for transmitting an acoustic signal to a first signal path and a receiver for receiving the acoustic signal at the first signal path. Also in this case, the transmitter and receiver can be implemented in a single ultrasonic transducer. The measurement pipe has a plurality of reflection surfaces at which the acoustic signal is reflected several times on the first signal path. Moreover, the measurement pipe comprises at least one connector and/or at least one planar functional surface, for arrangement and, if necessary, for determination of the transmitter and/or receiver on or in the measurement pipe. The inventive ultrasonic flow meter is characterized in that the reflection surfaces and the connector(s) and/or the planar functional surface(s) is/are formed as an integral part of the measurement pipe wall. Known are measurement pipes with integrally formed functional surfaces, but having separate reflection elements that are arranged in the objective measurement pipe. The same applies vice versa to flow meters with integrally formed reflection surfaces, but with separately mounted, welded connectors. The measurement pipe of the present invention has, inter alia, the advantage that its production is particularly time-saving.

It is advantageous if the reflection surfaces are aligned in such a way for reflection of the acoustic signal that a plurality of the reflection surfaces protrude at least partially into the basic shape of the measurement pipe and a plurality of the reflection surfaces protrude outwards at least from the basic shape of the measurement pipe. Using this arrangement, optimized signal path profiles can easily be implemented.

The reflection surfaces are formed in the measurement pipe wall such that multiple reflection occurs in the measurement pipe, wherein the signal path is reflected at least at three axially successively arranged reflection surfaces. Due to the successively arranged reflection surfaces, a change of the flow profile, which developed within the measurement range defined by the signal path can at least be partially determined and compensated.

In a particularly simple version, the reflection surfaces can have a planar shape.

In case of rapid currents, the ultrasonic signal can deviate from the ideal point of incidence on the respective reflection surface. This deviation continues at the subsequent reflection surface and can lead to a loss of signal with multiple reflections in the worst case. This error is defined as drift in the context of the present invention. To avoid these drifts, it is advantageous if the reflection surface or reflection surfaces are formed with a convex reflection surface curvature. Even though the pipe wall of a cylindrical pipe also has a convex shape, the contour of the reflection surface curvature in the present reflection surface differs from a curvature of the measurement pipe wall. This difference can be due, in particular, to the different arc length at constant inscribed angle or a central angle that has a vertex and is not located on the measurement pipe axis.

The at least one planar functional surface is advantageously formed from the measurement pipe by an internal high-pressure forming process. The internal high-pressure forming process is also known as hydroforming. In this case, an outer contour is shaped by an internal pressure. Soft rounded transitions between the measurement pipe elements is an essential feature of this technique. This technique is particularly preferred since the inner space of the measurement pipe does not have any flow-inhibiting sharp edges. In addition, the production time of a measurement pipe is particularly low in this shaping technology.

The connector can be formed from the planar functional surface by means of a flow-drilling process. As a result, the connector is formed as an integral part of the measurement pipe wall by material displacement. Therefore, a separate component of the connector need not be manufactured and welded in a separate production step, which means cost and time-savings. Forming a thread in this connector is particularly preferred.

It is advantageous if the measurement pipe comprises one or more additional measurement pipe sections or subregions of the measurement pipe, which have a larger measurement pipe cross-section than the first subregion of the measurement pipe, wherein the magnification of these measurement pipe sections is carried out by means of an internal high-pressure shaping process of the measurement pipe. An increase in the measurement effect is achieved by the first subregion with a lower measurement pipe cross-section. This is done by increasing the flow rate and thereby a larger $\Delta t$ in the measurement according to the runtime difference method.

The measurement pipe can advantageously be made of sheet metal, particularly preferably, with a wall thickness between 1-5 mm due to stability and malleability. This is much more malleable than cast iron pipes that are more commonly used. In addition, cracks or material weaknesses hardly occur when shaping sheet metal. Therefore, it is often mentioned as having a high tensile strength.

The reflection surfaces are formed, in particular, into the measurement pipe in such a way that a deflection of the signal path is performed such that each one of the at least three successive sub-paths of the signal path does not intersect the measurement pipe axis. By this arrangement, the flow profile is determined at different planes. Symmetric and asymmetric turbulence in the flow profile can be determined better.

It is particularly advantageous if the first signal path is composed of linear subsections, wherein
   a) each of the minimum distances of at least three subsections has a distance of 0.4-0.6 r to the measurement pipe axis, where r is the inner radius of the measurement pipe;
   b) wherein a first subsection, which defines a first plane parallel to the axis, comprises a directly corresponding second subsection, which defines a second plane that is parallel to the axis, wherein both planes pass through a first reflection surface and the normal vectors include an angle of less than 10°, c) wherein a third subsection, which defines a third plane parallel to the axis, comprises a directly corresponding fourth subsection, which defines a fourth plane parallel to the axis, wherein both planes pass through a second reflection surface and the normal vectors include an angle of less than 10°.

In this case, the course of the signal path can describe a polygon, whose lateral points of intersection lie within, on or outside the measurement pipe, in an axial plan view. This course of the signal path allows the measuring device, in particular, to consider rotation of the rotating currents in the measurement and to compensate for it.

It is particularly advantageous when the third and a fourth reflection surface are successively arranged on or in the measurement pipe, parallel to the measurement pipe axis.

And a fifth reflection surface; and
either
  i the transmitter or
  ii the receiver or
  iii a sixth reflection surface
are successively arranged on or in the measurement pipe, parallel to the measurement pipe axis, wherein the signal path consists of six or fewer linear sub-paths.

BRIEF DESCRIPTION OF THE DRAWINGS

Preferred embodiments of the invention will be explained in more detail with reference to the following drawings. Illustrated are.

DETAILED DISCUSSION IN CONJUNCTION WITH THE DRAWINGS

Figure 6:
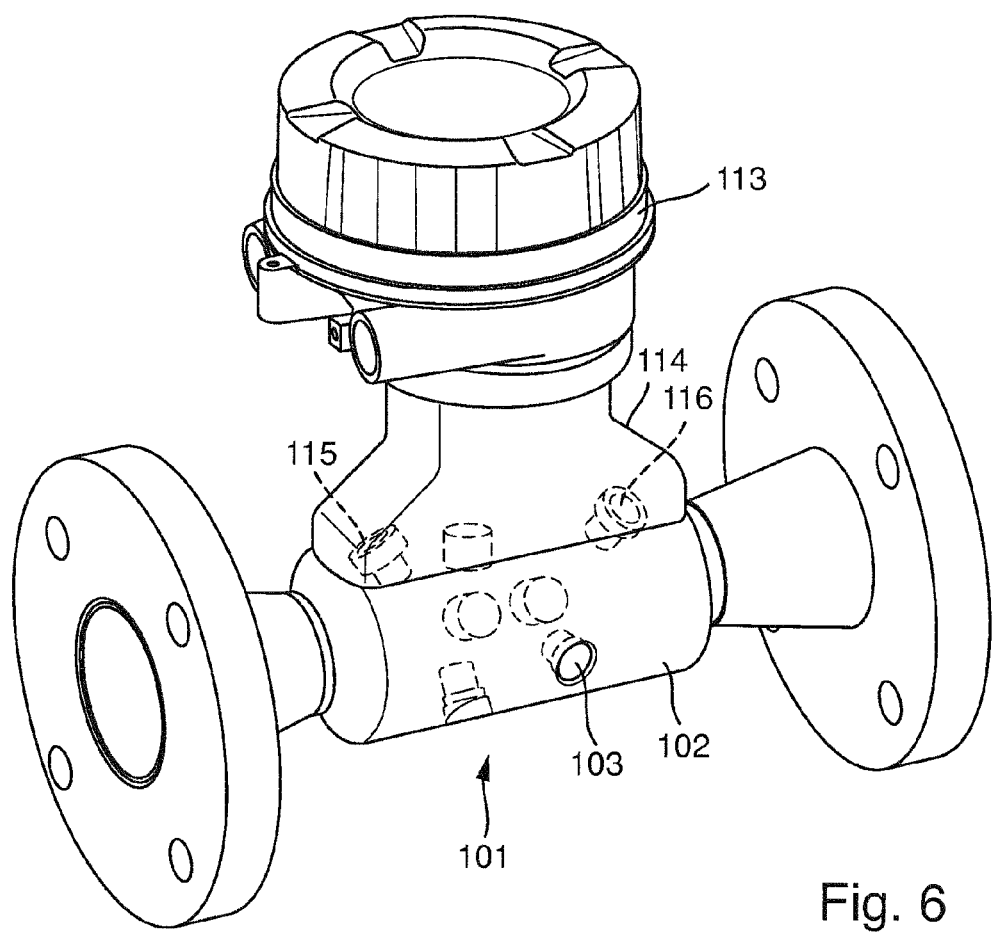
FIG. 6 is a partially transparent perspective view of an ultrasonic flow meter of the prior art.
Figure 7:
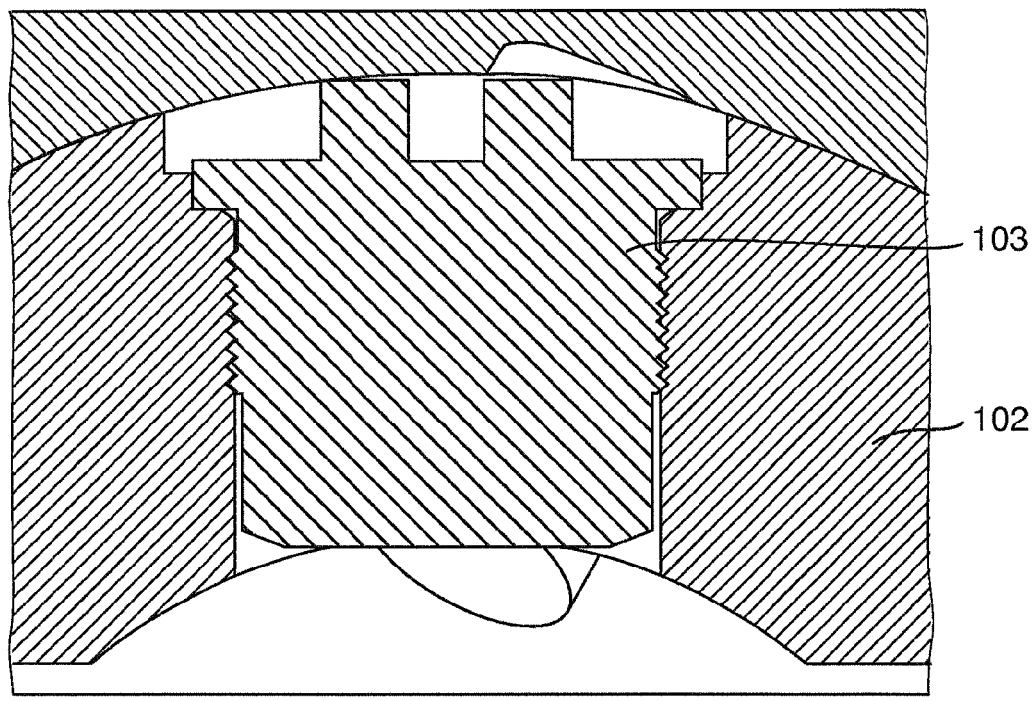
FIG. 7 is a view of the positioning of a reflector in the wall of the measurement pipe of the ultrasonic flow meter of FIG. 6.

FIG. 6 shows a layout of an ultrasonic flow meter 101, as has already been known from DE 10 2012 013 916 A1, which is referred to in its entirety in the context of the present invention. As seen from FIG. 6, reflectors 103 are fixed in a measurement pipe 102 of this ultrasonic flow meter 101. This is done by screwing the reflectors 103 in the connectors provided. These screwed reflectors 103 are shown again in FIG. 7 in detail.

In the transparent illustration of FIG. 6, two ultrasonic transducers are also shown, which are formed as transmitter 115 and receiver 116. The evaluation of the measurement signals and the transfer is carried out in a transmitter 113, which is fixed onto the measurement pipe via a connector 114 in the present example.

This arrangement comprising transmitter, receiver, transmitter 13 and connector 14 are identically applicable to the following FIGS. 1-5.

Figure 5:
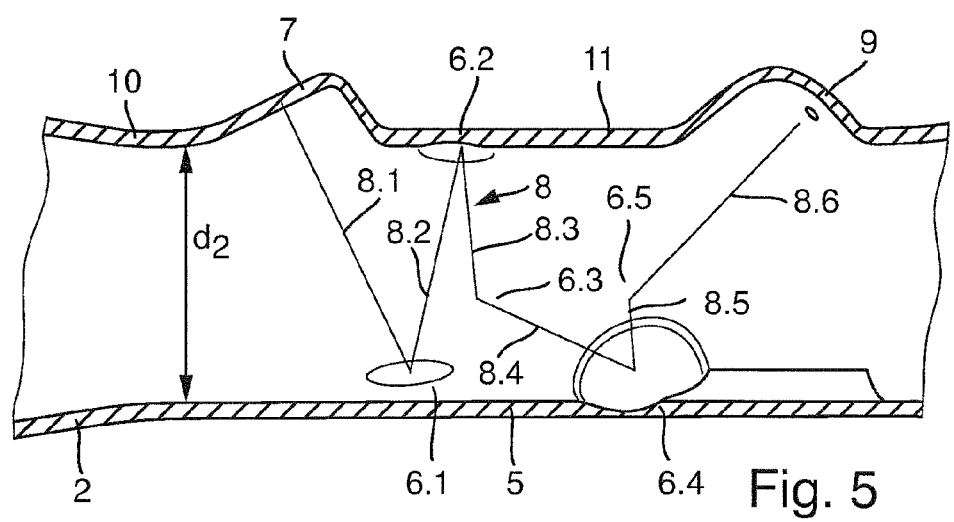
FIG. 5 is a side view of a second ultrasonic flow meter with cut subregion.

FIGS. 1-5 shows a layout of a measurement pipe 2 of an ultrasonic flow meter 1 according to the invention and, in particular, FIG. 5, a preferred signal path course with a signal path 8, which substantially corresponds to the signal path course of FIG. 6.

The signal path 8 in the present case consists of six linear subsections 8.1 to 8.6. The measurement pipe 2 can be connected at the end of each pipe segment of a pipe via flanges 3.

In the area of the flanges 3, the measurement pipe comprises a second and a third measurement pipe section or subsections 5 and 12 with a measurement pipe inner diameter $d_1$, which decreases with an inner diameter $d_2$ towards the center of the measurement pipe to a first measurement pipe section or subsection 4.

Along this first subregion 4, two functional surfaces 7 and 9 are arranged in the measurement pipe 2 in the specific embodiment of FIGS. 1-5. At these functional areas, a clamp-on sensor, which leads the ultrasonic signal through a measurement pipe wall 11 directly into the measurement pipe 2 can be connected. Alternatively, connectors can also be formed from the functional surfaces 7 and 9, integrated in the measurement pipe wall. This can particularly preferably be carried out by a flow-drilling method.

Furthermore, five reflection surfaces 6.1 to 6.5 are formed in the measurement pipe, or formed from the measurement pipe wall for guiding the signal path in the measurement pipe. In relation to the present invention, the term "formed from" includes pressing the reflection surfaces inwards into the pipe wall as well as pressing the reflection surfaces outwards out of the pipe wall. While pressing the reflection surfaces into the measurement pipe wall, the reflection surface is arranged relative to the remaining measurement pipe wall such that it slightly projects into the measurement pipe. Pressing out of the measurement pipe wall is performed such that the reflection surfaces protrude out of the remaining outer peripheral measurement pipe section.

In a particulate embodiment according to the invention, one or more reflection surfaces protrude at least partially from the outer periphery on the one hand. On the other hand, one or more additional or, in particular, also the same reflection surface protrudes into the measurement pipe. By this arrangement of the reflection surface, more individualized alignment of each reflection surface is achieved, thereby allowing implementation of more complicated signal path courses.

Alternatively, an additional sixth reflector, which allows a return of the signal along the second signal path, can be arranged instead of the receiver. In this case, an ultrasonic transducer acts as both the transmitter and the receiver, depending on the operating mode.

Alternatively, the ultrasonic transducer can be arranged only on the measurement pipe, as a so-called clamp-on ultrasound transducer, and preferably, coupled to the measurement pipe via a functional surface as shown in DE 102 49 542 A1.

In the configuration of the reflection surfaces 6.1 to 6.5, preferably areas with a concave surface are advantageous, since these counteract a drift of the ultrasonic signal at larger flow rates. Of course, each round pipe has a concave surface, but this is given per se by the pipe shape and is not especially molded into the measurement pipe. The contour of the reflection surface thus stands out from the contour of the measurement pipe wall by means of the molding.

Flattening of flow profile is achieved by the transition 10 from the second subregion 5 with a larger diameter $d_1$ to the first subregion 4 with a smaller diameter $d_2$. The angle of contact α of the transition 10, in relation to a straight pipe wall is preferably less than 15°, preferably less than 10°, in particular 6-8°. This is advantageous, for example when the medium to be measured has traversed a defect, for example a curvature. In this case, a larger mass of the medium acts on a wall portion of the measurement pipe 2 more intensely than on this part opposite the wall area due to the inertia of the medium. A flow rectifier is typically used for compensation. Nevertheless, the measurement device can have already caused flattening of the flow profile, without the need for an upstream flow rectifier. This leads to a wider range of applications and a smaller footprint when using ultrasonic flow meters in pipelines. In addition to curvatures, pertinent faults could also be deposits or other objects in the pipeline, for example, at sampling points, which can be compensated in the same way without additional components. The fundamental characteristics of the flow are maintained here.

Turbulence and rotational motion also occur frequently besides the occurrence of faults caused by uneven mass distribution of the medium.

These are compensated for by double reflection from at least two linear subsections 8.1 and 8.4 of the signal path. The actual signal course of the embodiment of FIGS. 1-3 will be described in more detail below.

An ultrasonic signal is transmitted to the measurement pipe starting from the ultrasonic transducer 7, namely the transmitter. The signal course through the measurement pipe between the ultrasonic transducer 7, if it is acting as a transmitter, and the ultrasonic transducer 9, if it is acting as a receiver, characterizes a first signal path.

A second signal path describes the signal course from the ultrasonic transducer 9, as a transmitter, to the ultrasonic transducer 7, as a receiver and will not be considered in detail in the following.

This ultrasonic signal traverses a first subsection 8.1 along the first signal path 8, is reflected on the reflection surface 6.1 and then traverses a second subsection 8.2 along the first signal path 8.

The first subsection in this case has a distance of 0.4-0.6 r to the measurement pipe axis, where r is the inner radius of the measurement pipe. In the best case shown in FIG. 1, in which the course of the signal path describes an equilateral triangle, which has its vertices on the reflection surfaces, the distance to the measurement pipe axis is 0.5 r.

However, the distance can be larger or smaller so that the triangle or its vertices lie inside or outside of the measurement pipe.

Figure 1:
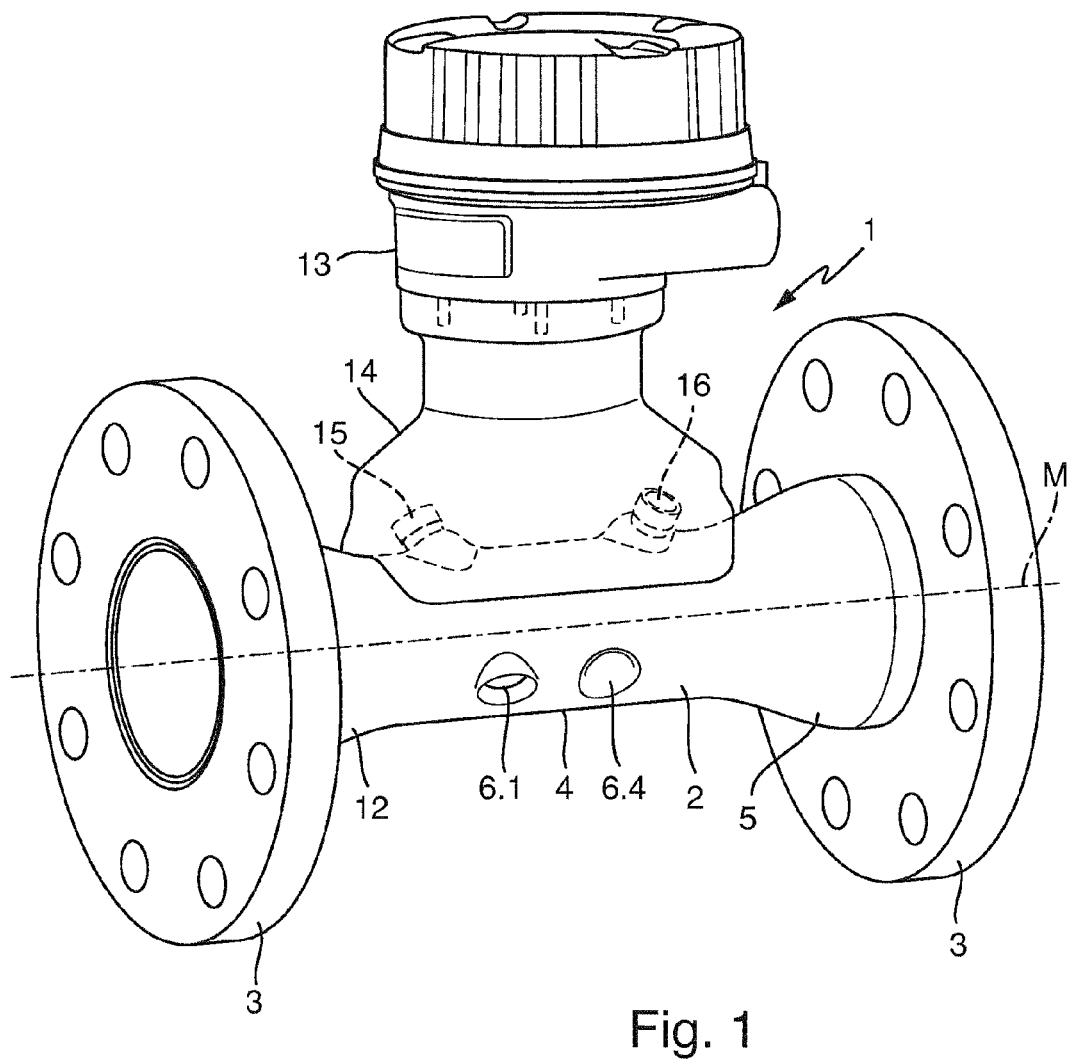
FIG. 1 is an axial plan view of an inventive ultrasonic flow meter.

The first and the second subsections 8.1 and 8.2 are ideally on the one and same plane parallel to the axis, as also shown in FIG. 1.

In a less ideal case, the first subsection 8.1 spans a first plane parallel to the axis. The second subsection directly corresponding to the first subsection spans a second plane parallel to the axis.

Here, the signal path continues along the axial direction. Both planes pass through the first reflection surface 6.1. Starting from the reflection surface, the planes open at only a small angle of less than 10° so that the planes are more or less parallel to each other, except for this minor deviation.

The inventive beam path of the subsections 8.1 and 8.2 thus describes a back reflection of the subsection 8.1 in an almost identical plane, as a result of which a rotating flow can be detected and/or compensated in a first rotational direction by measurement.

Figure 2:
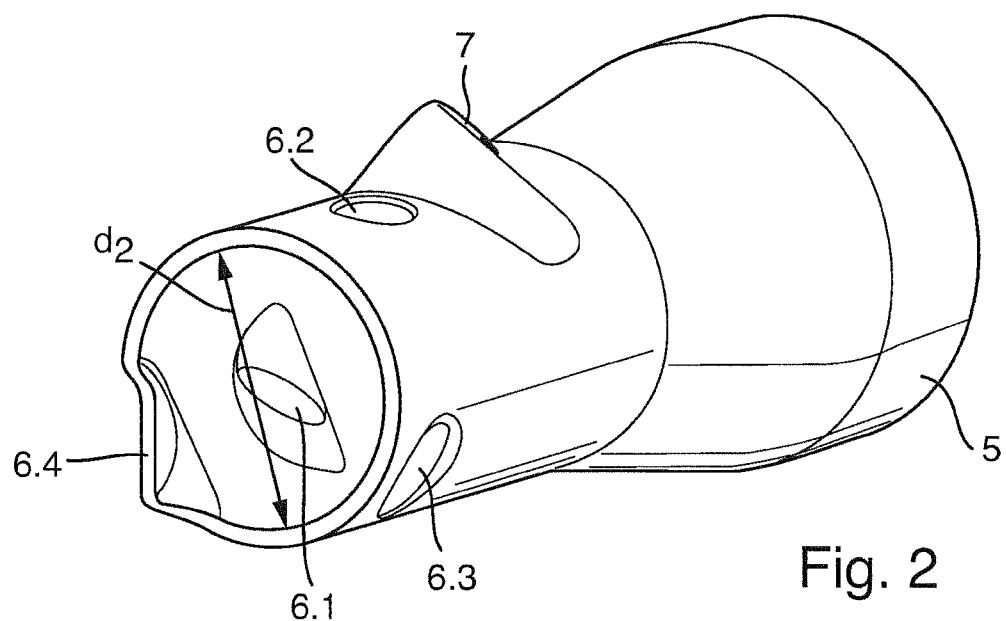
FIG. 2 is a sectioned perspective view of the ultrasonic flow meter.
Figure 3:
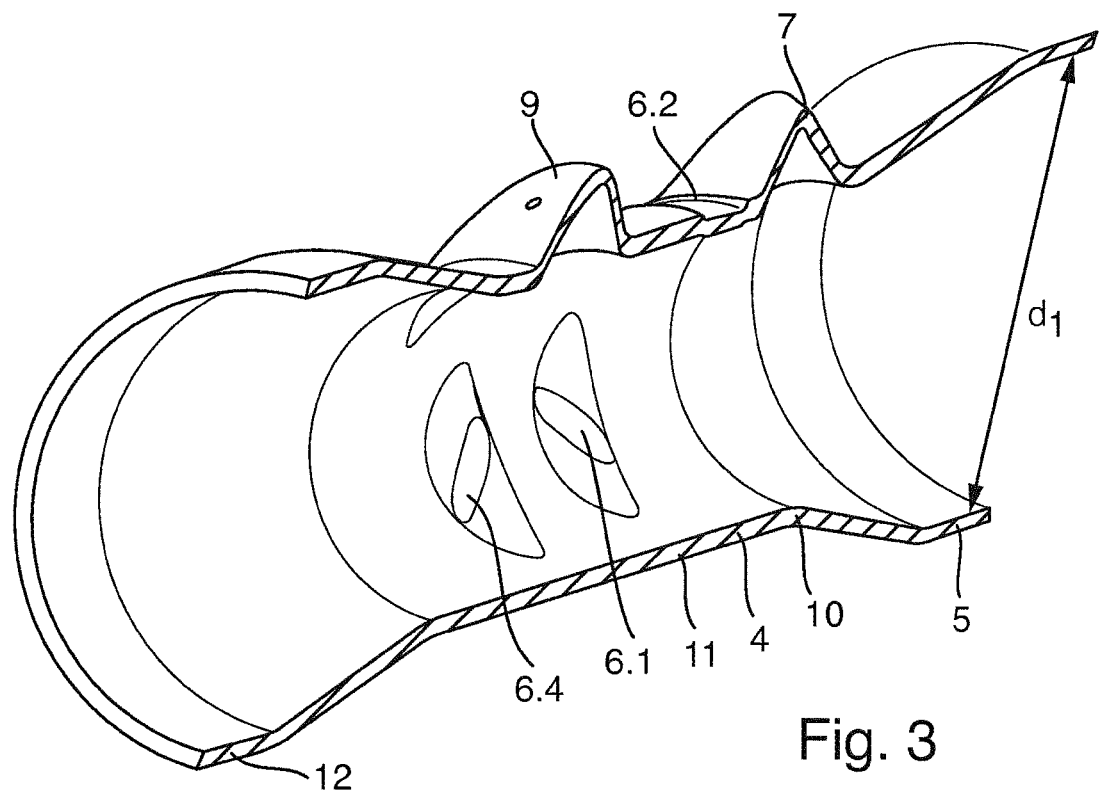
FIG. 3 is a perspective view with a cut subregion of the ultrasonic flow meter according to the invention.
Figure 4:
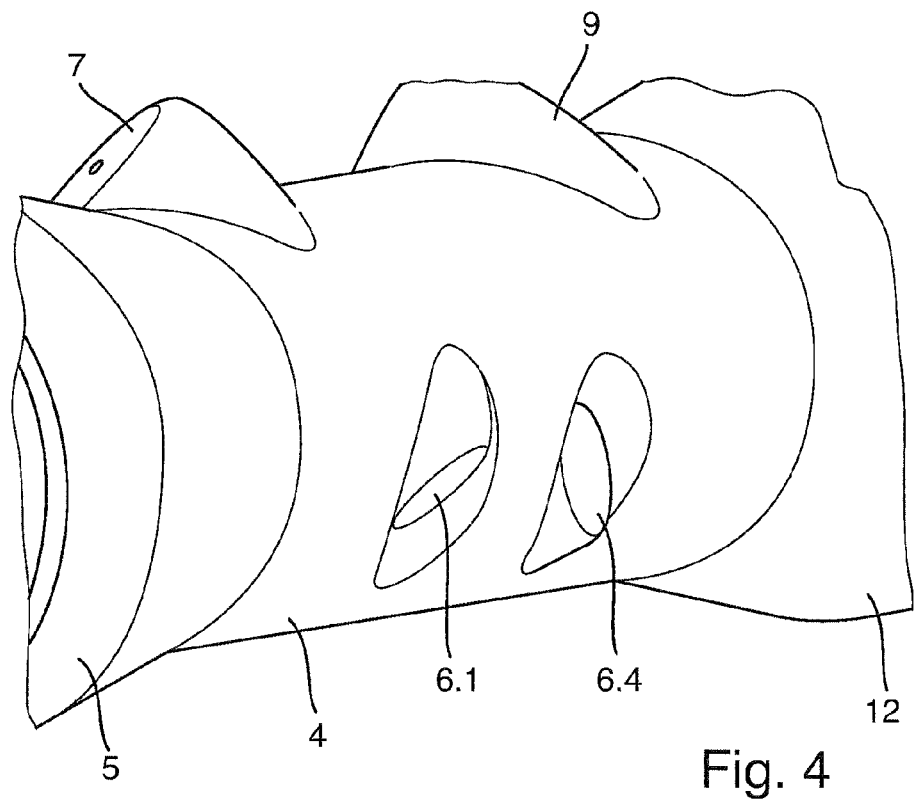
FIG. 4 is a side view of the base body of the ultrasonic flow meter.

In FIG. 2, a third subsection 8.4 is traversed on the first signal path 8 between the reflectors 6.3 and 6.4. This is reflected on the reflection surface 6.4 and traverses a fourth subsection 8.4 on the first signal path 8 up to the reflector 6.5.

The third subsection also has a distance of 0.4-0.6 r to the measurement pipe axis, where r is the inner radius of the measurement pipe and the distance is 0.5 r in this case.

However, the distance can be larger or smaller so that the triangle or its vertices lie inside or outside of the measurement pipe.

Back reflection also occurs in the present case, as has already been described for the first subsection 8.1.

The inventive beam path of the subsections 8.4 and 8.5 describes a back reflection of the subsection 8.4 in an almost identical plane, as a result of which a rotating flow can be detected and/or compensated in a second rotational direction by measurement.

This second rotational direction is preferably opposite the first direction of rotation, so that complete compensation of the rotating components of the flow can be carried out.

Symmetric detection of the position of the flow and detection of the symmetrical turbulence requires the representation of the course of the signal path as a polygon, whose lateral points of intersection lie within, on or outside of the measurement pipe in the axial plan view. It is understood that the polygon is not compulsorily formed by successive subsections, but also two consecutive subsections can run on a side of the polygon.

This polygon is optimally a triangle, but can also be formed as a polygon due to the mutual offset of the planes.

This offset can occur, for example in production-related deviations.

Based on the back reflection described above, FIG. 2 first shows an ultrasonic signal that is emitted from the transmitter 7 and reflected back from the subsection 8.1 to the subsection 8.2. Then, the emitted ultrasonic signal passes through the subsection 8.3. Finally, the ultrasonic signal is reflected back a second time from the subsection 8.4 to the subsection 8.5. By another reflection, the ultrasound signal is finally transmitted to the receiver 9. Overall, the ultrasonic signal traverses six subsections, thus facilitating particularly compact construction of an ultrasonic flow meter. It is also possible to allow a correction within a wide flow coefficient range.

Thus, rotating currents with turbulence can reliably be detected by the closed signal path course in combination with the double back reflection, as they can occur later, for example, at faults in the pipe, for example, pipe bends, 90° bends, etc. This detection of rotating currents complements itself perfectly with the previously described flow compensation by narrowing of the inner diameter of measurement pipe wall within the measurement pipe to compensate for faults in the measurement.

In a second, less illustrated embodiment of a flow meter according to the invention, the flow meter can comprise an asymmetrical structure, with a signal course that is essentially same as in FIGS. 1-4, wherein a front part or subregion is a pipe segment with a constant tube diameter $d_1$, ultrasonic transducers and reflection surfaces are arranged for a first identical direction of the flow and in the rear part or subregion of the measurement pipe. This compact design of the signal path allows use of existing pipe widths at the front subregion as an inlet path to minimize flow turbulence. From the pipe segment, i.e. the front measurement pipe section of the measurement pipe, a transition that leads at an angle of 10° to a first subregion with narrowed inside diameter $d_2$ is arranged in the direction of flow.

The arrangement of the reflection surfaces and the associated signal course shown in FIGS. 1-5 are also basically known from DE 10 2012 013 916 A1 and constitute a particularly advantageous version of the signal routing of an ultrasonic signal in case of a multiple reflection.

As FIG. 6 shows, the reflectors are screwed into the measurement pipe. Inclined holes are first introduced into the measurement pipe and the thread is cut in the measurement pipe wall in the hole due to the different angles of incidence and reflection of the signals. Then, the reflector is screwed into the measurement pipe. The alignment of the reflection surfaces in the measurement pipe is important in the design of a measurement pipe with a signal path course that is implemented by multiple reflection. For this purpose, a drilling pattern that must be adhered to very precisely during production is required in the embodiment shown in FIG. 6.

Contrary to this, both the reflection surfaces and the connector of the measurement pipe are integral parts of the measurement pipe. They have not been welded but are formed from the material of the measurement pipe.

Connection points, such as weld seams or screw connections are not present between the measurement pipe and the connector and between the measurement pipe and the reflection surfaces. Consequently, no leaks occur at these locations and the connector can be produced in a cost-effective way.

The first measurement pipe section described in FIGS. 1-5 substantially has this constant inside diameter $d_2$ over its entire course. Slight deviations from the constant inside diameter $d_2$ occur only in the area of the reflection surfaces due to production reasons.

The basic shape of the measurement pipe section is cylindrical in FIGS. 1-5, but it can also have a different shape. For example, square pipe shapes or the like are also known. The basic shape extends essentially over the entire course of the measurement pipe section. The measurement pipe section has, in particular, an essentially constant measurement pipe cross-section over its entire course.

In this context, it essentially means that the measurement pipe wall deviates from this basic shape in the area of the reflection surfaces, since the reflection surfaces are integrally formed from the basic shape of the measurement pipe section or are formed in the basic shape of the measurement pipe section by a shaping process. Therefore, the contour of the measurement pipe wall deviates from its basic shape in the area of the reflection surfaces.

The molding of the reflection surfaces is carried out, in particular, by means of an internal high pressure shaping process.

The second and/or third measurement pipe sections shown in FIGS. 1-5, are funnel-shaped with a cross-section that increases to the end sections of the measurement pipe. The second and/or third measurement pipe section with the above-described funnel-shaped profile is formed from the measurement pipe wall as an integral part of it, together with the first measurement pipe section, as seen in FIGS. 1-5. To this end, an internal high-pressure shaping process is particularly preferable.

Thus, the measurement pipe shown in FIGS. 1-5 can be produced in one and the same shaping process. Subsequently, the connector can be produced from the functional areas by another shaping process, in particular, a flow-drilling process.

The manufacturing method of the measurement pipe shown in FIGS. 1-5 will be explained in more detail below.

The measurement pipe is first subjected to a so-called hydroforming or internal high-pressure shaping process. This is characterized by the provision of an outer contour, to which the measurement pipe wall is pressed. This results in a contour of the measurement pipe, in relation to both the inner and the outer wall of the measurement pipe.

All malleable materials with high tensile strength, including cast measurement pipes to a certain extent are suitable for the internal high-pressure process, as they are mainly used in the construction of ultrasonic flow meters. However, a measurement pipe made of sheet metal has been found to be a more ideal material for the shaping process.

The pressure for molding the measurement pipe can be varied according to the wall thickness. Usually, only surfaces can be pushed outwards from the basic shape of the measurement pipe by means of an internal high-pressure method. However, the measurement pipe of FIGS. 1-5 also shows reflection surfaces that seem to partially pressed into the measurement pipe. This can be achieved by using a measurement pipe with a slightly smaller nominal diameter than the target nominal diameter of the measurement pipe. The target nominal diameter can be, for example, a nominal diameter of DN-30. The measurement pipe has this nominal diameter, irrespective of the areas of the reflection surfaces, following its shaping. In contrast, the nominal diameter of the measurement pipe before its shaping can only be DN-28. Upon application of pressure, the nominal diameter of the measurement pipe of DN-28 is increased to the nominal diameter DN-30. As a result, reflection surfaces can not only partially protrude outwardly from the measurement pipe wall but also partially protrude from the measurement pipe wall into the measurement pipe. This applies particularly to the first measurement pipe section of FIGS. 1-5, having a cylindrical basic shape, and in contrast, the reflection surfaces are formed as an integral part of the measurement pipe wall.

By means of the aforementioned process, a more individualized alignment of the reflection surfaces is possible compared to a pure pressing process, without too much production-related reduction in the measurement pipe cross-section.

Following the aforementioned process for "forming out" and definition of the reflection surfaces on the measurement pipe, a connector is formed into the measurement pipe.

This is particularly preferably done by means of a so-called flow-drilling process. In this case, a flow drill is placed on the planar functional surface and by exertion of axial forces and at a high speed, the metallic material of the functional surface is partially melted and displaced to the outside at temperatures of preferably 600-800° C. The displaced material extension forms the connector. A thread is formed in this connector by a thread former. A thread cutter can also be used, but a thread former is recommended to prevent burrs and to avoid any risk of material weakening of the connector by material removal. The resulting connector has a closed tool contour without free clamping surfaces. Unlike cut threads, the connector has a higher thread material strength due to the material compression in the joint, which is especially beneficial in high-pressure ultrasonic applications.

Figure 8:
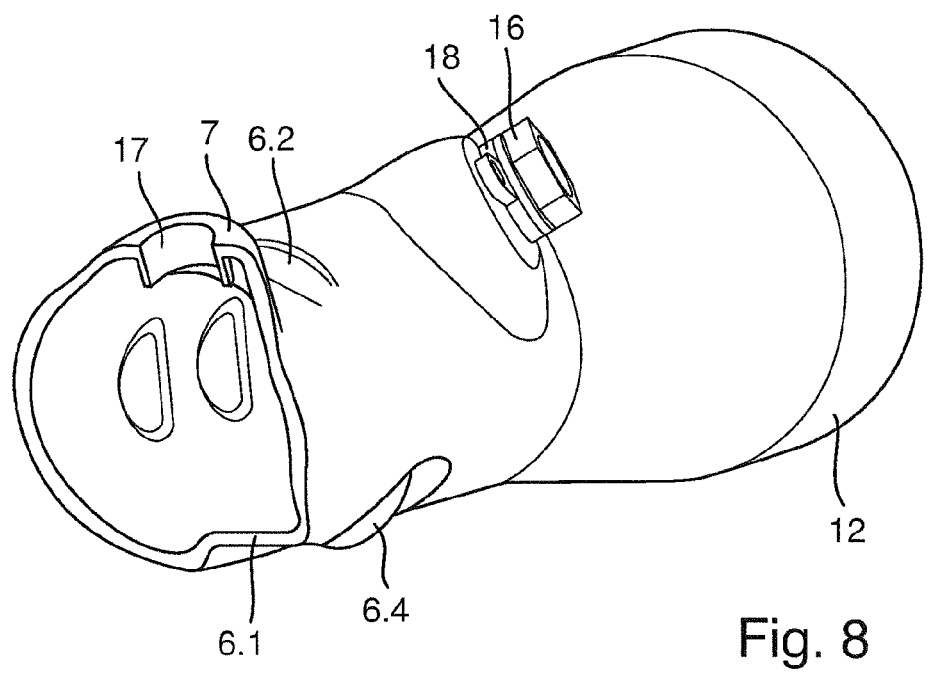
FIG. 8 is a sectional cut-out of the measurement pipe of FIG. 1-5 with a connector that is integrated in the measurement pipe for holding the transmitter and/or receiver.

FIG. 8 shows two such integrally molded connectors 17, wherein a transmitter 15 or a receiver 16 is located within one of the two connectors. This connector 17 has a seamless material transition between the measurement pipe wall 11 that is parallel to the measurement pipe axis M and the measurement pipe wall 11 that is perpendicular to measurement pipe wall and forms the connector 17. This connector is formed from one of the functional surfaces 7 or 9 of the measurement pipe 2.

As an operation by drilling or the like would adversely weaken the measurement pipe wall, a disk-shaped plate 18 with a connection for a ground cable is provided between the receiver and the connector.

The invention claimed is:

1. An ultrasonic flow meter, comprising:
a measurement pipe, said measurement pipe comprising a measurement pipe wall, at least locally, with a basic shape with rotationally symmetrical or polygonal cross-section and a linear measurement pipe axis;
a transmitter for transmitting an acoustic signal to a first signal path; and
a receiver for receiving said acoustic signal on said first signal path, wherein:
said measurement pipe comprises a plurality of reflection surfaces at which said acoustic signal on said first signal path is reflected several times;
said reflection surfaces form an integral part of said measurement pipe wall;
said reflection surfaces are aligned wherein for reflection of the acoustic signal that one or more of said reflection surfaces protrude at least partially into the basic shape of said measurement pipe and one or more of said reflection surfaces protrude outwards at least from the basic shape of said measurement pipe; and
said reflection surface is formed from the measurement pipe by an internal high-pressure process.

2. The ultrasonic flow meter according to claim 1, wherein:
said measurement pipe comprises at least one connector and/or at least one planar functional surface, for arrangement and, if necessary, for determination of said transmitter respectively said receiver on or in said measurement pipe, said at least one connector(s) respectively said planar functional surface(s) form an integral part of said measurement pipe wall.

3. An ultrasonic flow meter, comprising:
a measurement pipe, said measurement pipe comprises a measurement pipe wall and a linear measurement pipe axis;
a transmitter for transmitting an acoustic signal to a first signal path; and
a receiver for receiving said acoustic signal on said first signal path, wherein:
said measurement pipe comprises a plurality of reflection surfaces at which said acoustic signal on said first signal path is reflected several times, and at least one connector and/or at least one planar functional surface, for arrangement and, if necessary, for determination of said transmitter respectively said receiver on or in said measurement pipe;
said reflection surfaces and said at least one connector respectively said planar functional surface(s) form an integral part of said measurement pipe wall; and
said reflection surface respectively connector respectively planar functional surface is formed from the measurement pipe by an internal high-pressure forming process.

4. The ultrasonic flow meter according to claim 3, wherein:
said reflection surfaces are aligned wherein for reflection of said acoustic signal that a plurality of said reflection surfaces protrude at least partially into the basic shape of said measurement pipe and a plurality of said reflection surfaces protrude outwards at least from the basic shape of said measurement pipe.

5. The ultrasonic flow meter according to claim 3, wherein:
said reflection surfaces are formed in said measurement pipe wall wherein multiple reflection occurs in said measurement pipe; and
said signal path is reflected at least at three axially successively arranged reflection surfaces.

6. The ultrasonic flow meter according to claim 1, wherein:
said reflection surface or said reflection surfaces is/are planar or convexly formed with a curvature of said reflection surface;
the contour of the curvature of said reflection surface differs from a curvature of said measurement pipe wall.

7. The ultrasonic flow meter according to claim 2, wherein:
said planar functional surface(s) is/are formed from said measurement pipe by an internal high-pressure forming process.

8. The ultrasonic flow meter according to claim 5, wherein:
said planar functional surface is provided for coupling a clamp-on ultrasonic transducer.

9. The ultrasonic flow meter according to claim 3, wherein:
said at least one connector is formed from said planar functional surface by means of a flow-drilling process.

10. The ultrasonic flow meter according to claim 1, wherein:
said measurement pipe comprises a first subregion and additional subregions, which have a larger measurement pipe cross-section than said first subregion; and
the magnification of said measurement pipe cross-section of said subregions takes place by means of an internal high-pressure forming process of said measurement pipe.

11. The ultrasonic flow meter according to claim 1, wherein:
said measurement pipe comprises a first subsection, in which said reflection surfaces are arranged, said first subsection has a basic shape with rotationally symmetrical or polygonal cross-section, in particular, a cylindrical basic shape,
said basic shape extends along the entire course of said first subsection; and
said measurement pipe wall deviates from its basic shape in the region of said reflection surfaces.

12. The ultrasonic flow meter according to claim 1, wherein:
said measurement pipe wall is made of sheet metal, preferably with a sheet thickness of 1-5 mm.

13. The ultrasonic flow meter according to claim 1, wherein:
said reflection surfaces are formed in said measurement pipe wherein a deflection of said signal path is performed wherein each of the at least three successive sub-paths of said first signal path does not intersect said measurement pipe axis.

14. The ultrasonic flow meter according to claim 1, wherein:

said first signal path is composed of linear subsections,
a) each of the minimum distances of at least three subsections has a distance of 0.4-0.6 r to said measurement pipe axis, where r is the inner radius of the measurement pipe;
b) a first subsection which defines a first plane parallel to the axis, comprises a directly corresponding second subsection, which defines a second plane that is parallel to the axis, both planes pass through a first reflection surface and the normal vectors include an angle of less than 10°; and
c) a third subsection, which defines a third plane parallel to the axis, comprises a directly corresponding fourth subsection, which defines a fourth plane parallel to the axis, both planes pass through a second reflection surface and the normal vectors include an angle of less than 10°.

15. The ultrasonic flow meter according to claim 1, wherein:
the course of said signal path, in the axial plan view, describes a polygon, whose lateral intersections lie within, on or outside said measurement pipe.

16. The ultrasonic flow meter according to claim 14, wherein:
said third and a fourth reflection surfaces are arranged successively on or in said measurement pipe, parallel to said measurement pipe axis and a fifth reflection surface, and either:
i said transmitter or
ii said receiver or
iii a sixth reflection surface are successively arranged on or in said measurement pipe, parallel to said measurement pipe axis; and
said signal path consists of six or fewer linear sub-paths.

17. The ultrasonic flow meter according to claim 1, wherein:
the ultrasonic flow meter takes into account rotational balancing of circulating flows.

18. The ultrasonic flow meter according to claim 1, wherein:
said reflection surface or said reflection surfaces is/are planar or convexly formed with a curvature of said reflection surface; and
the contour of the curvature of said reflection surface differs from a curvature of said measurement pipe wall by a different arc length at constant arc angle or by a central angle, having an apex that is not on the measurement pipe axis.

* * * * *